(12) United States Patent
Thomas et al.

(10) Patent No.: US 10,572,435 B2
(45) Date of Patent: Feb. 25, 2020

(54) TECHNIQUES OF ACCESSING SERIAL CONSOLE OF BMC USING HOST SERIAL PORT

(71) Applicant: American Megatrends International, LLC, Norcross, GA (US)

(72) Inventors: Satheesh Thomas, Dunwoody, GA (US); Baskar Parthiban, Johns Creek, GA (US); Revanth Sreenivasan A, Chennai (IN); Aruna Venkataraman, Duluth, GA (US)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 0 days.

(21) Appl. No.: 16/040,937

(22) Filed: Jul. 20, 2018

(65) Prior Publication Data
US 2020/0026682 A1    Jan. 23, 2020

(51) Int. Cl.
G06F 13/42    (2006.01)
G06F 9/445    (2018.01)

(52) U.S. Cl.
CPC ...... *G06F 13/4282* (2013.01); *G06F 9/44505* (2013.01)

(58) Field of Classification Search
CPC .................. G06F 13/4282; G06F 9/44505
See application file for complete search history.

(56) References Cited

U.S. PATENT DOCUMENTS

2013/0326278 A1* 12/2013 Yin ............... G06F 11/362
                                              714/38.1
2016/0261455 A1*  9/2016 Su ................ H04L 41/069

* cited by examiner

*Primary Examiner* — Nimesh G Patel
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be an embedded-system device. In an aspect of the disclosure, a method, a computer-readable medium, and an apparatus are provided. The apparatus may be an embedded-system device. The embedded-system device provides to a host of the embedded-system device control of a first serial port controller of the embedded-system device. The embedded-system device further connects a serial port with the first serial port controller. The embedded-system device also determines whether the embedded-system device is in a predetermined condition. The embedded-system device disconnects the serial port from the first serial port controller and connecting the serial port with a second serial port controller when the embedded-system device is in the predetermined condition.

20 Claims, 4 Drawing Sheets

TECHNIQUES OF ACCESSING SERIAL CONSOLE OF BMC USING HOST SERIAL PORT

BACKGROUND

Field

The present disclosure relates generally to embedded-system devices, and more particularly, to techniques of providing access to a serial console of a baseboard management controller (BMC) by switching connection to a serial port from a host controlled serial controller to a BMC controlled serial controller.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, simple network management protocol (SNMP) traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc. A BMC may be considered as an embedded-system device.

A debug header of a BMC may be removed on the final production. The BMC in production may undergo various changes in the field. These include component changes, firmware updates etc. These changes may generate issues in some cases. As the debug header is removed from the BMC 102 in production, debugging the BMC can be challenging. Therefore, there is a need for a mechanism that provide access to BMC serial console.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be an embedded-system device. The embedded-system device provides to a host of the embedded-system device control of a first serial port controller of the embedded-system device. The embedded-system device further connects a serial port with the first serial port controller. The embedded-system device also determines whether the embedded-system device is in a predetermined condition. The embedded-system device disconnects the serial port from the first serial port controller and connecting the serial port with a second serial port controller when the embedded-system device is in the predetermined condition.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
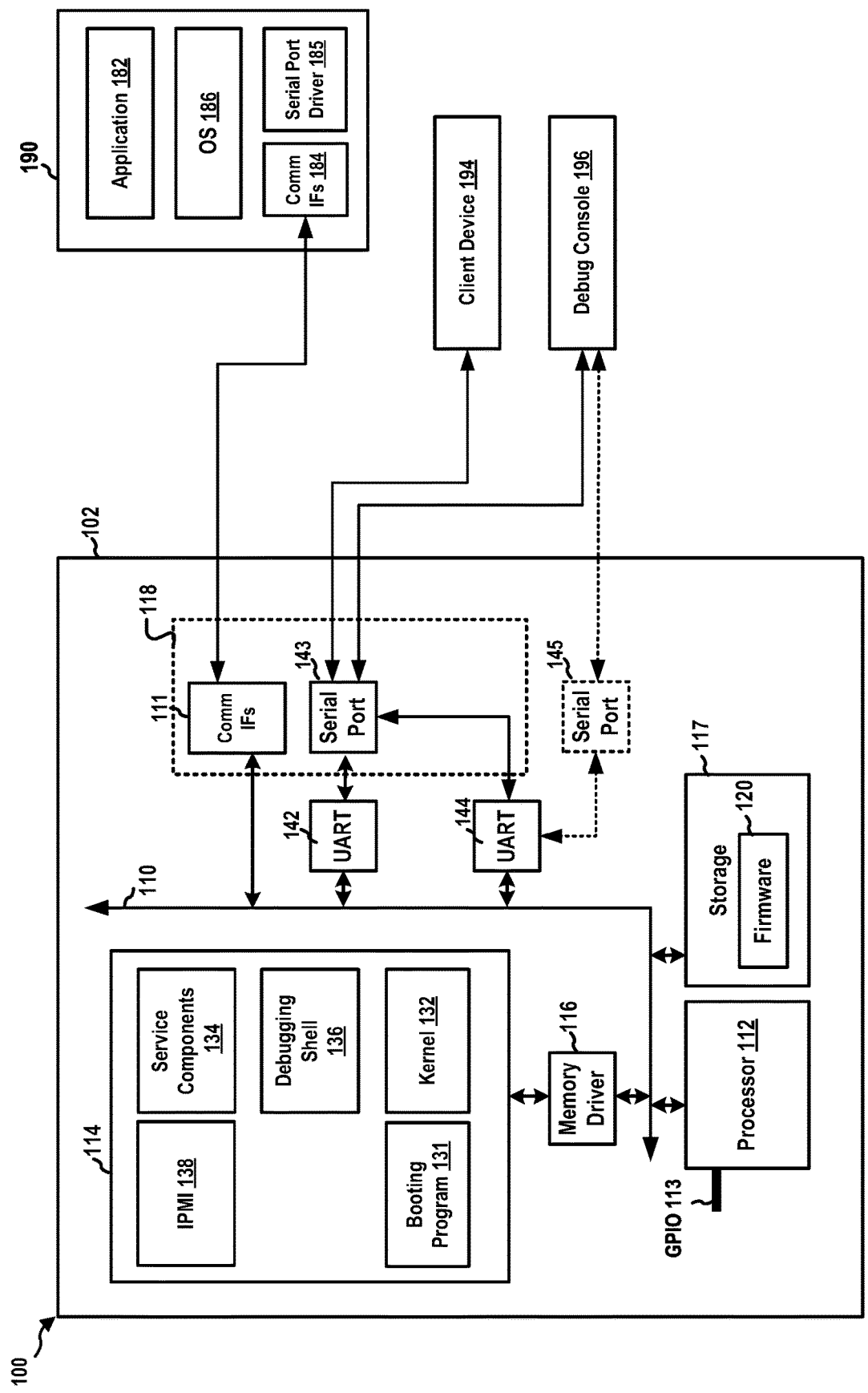
FIG. 1 is a diagram illustrating an embedded-system device.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram 100 illustrating a computer system. The computer system includes a BMC 102, and a host computer 190. The BMC 102 has a processor 112, a memory 114, a memory driver 116, a storage 117, communication interfaces 111, a serial port controller 142, a serial port controller 144, and a serial port 143. The serial port 143 and other serial ports described infra may be COM ports supporting "TIA-232-F Interface Between Data Terminal Equipment and Data Circuit-Terminating Equipment Employing Serial Binary Data Interchange" (RS-232) standard, issued in 1997, which is incorporated herein by reference in its entirety. In certain configurations, one or more of the above components may be implemented as a system-on-a-chip (SoC). For examples, the processor 112, the memory 114, the storage 117, the serial port controllers 142, 144, and the serial port 143 may be on the same chip. The memory 114, the processor 112, the memory driver 116, the storage 117, the serial port controller 142, the serial port controller 144, and/or the communication interfaces 111 may be in communication with each other through a communication channel 110 such as a bus architecture. The processor 112 has multiple pins that output signals to the communication channel 110. In particular, the pins include a GPIO pin 113. The serial port controllers 142, 144 and other serial port controllers described infra may be universal asynchronous receiver/transmitter (UART) devices.

The BMC 102 may store BMC firmware 120 in the storage 117. When the processor 112 executes the BMC firmware 120, the processor 112 loads code and data of the BMC firmware 120 into the memory 114. This example shows that the BMC firmware 120 provides in the memory 114, among other components, a boot loader 131, a kernel 132, one or more service components 134, a debugging shell 136, and an IPMI service 138.

The IPMI service 138 supports IPMI and provides an IPMI interface 118. The IPMI interface 118 may be implemented over the serial port 143 and/or the communication interfaces 111. The communication interfaces 111 may include a keyboard controller style (KCS), a server management interface chip (SMIC), a block transfer (BT) interface, a system management bus system interface (SSIF), a Universal Serial Bus (USB) interface, a PCI/PCIe interface, a network interface (e.g., LAN/Wireless LAN interface), and/or other suitable communication interface(s). The IPMI service 138 may receive and send IPMI messages through the IPMI interface 118.

The BMC 102 may be in communication with the host computer 190 through the communication interfaces 111 and/or the IPMI interface 118. The BMC 102 may manage the host computer 190. The host computer 190 includes, among other components, a host OS 186, a host application 182, a serial port driver 185, and host communication interfaces 184.

In certain configurations, when developing the BMC 102, the BMC 102 in the development stage also include a serial port 145. The debugging shell 136 runs on top of the kernel 132 and receives debugging data from the service components 134. The debugging shell 136 may, through the kernel 132, drive the serial port controller 144 to generate signals for outputting at the serial port 145. A client console may be connected to the serial port 145 and present debug data in accordance with the signals received through the serial port 145. As such, a user can debug the service components 134 through the client console.

The serial port 145 (i.e., a debug header) is removed on the final production of the BMC 102. The BMC 102 in production may undergo various changes in the field. These include component changes, firmware updates etc. These changes may generate issues in some cases. As the debug header is removed from the BMC 102 in production, debugging the BMC 102 can be challenging.

In certain configurations, the BMC 102 provides the serial port controller 142 and the serial port 143 for use by the host computer 190, e.g., through the communication interfaces 111. The host computer 190 can drive the serial port controller 142 to send and receive signals at the serial port 143. In particular, a host application 182 can use a serial port driver 185 provided by a host OS 186 to operate the serial port controller 142 through the host communication interfaces 184 and the communication interfaces 111. The serial port controller 142 controls communication at the serial port 143. As such, a computing device 194 can connect to the serial port 143 and communicate with the host application 182.

Further, in certain configurations, the BMC 102 allow dynamic routing of the serial port 143 to the serial port controller 142 and the serial port controller 144. As described supra, the processor 112, the memory 114, the storage 117, the serial port controllers 142, 144, and the serial port 143 may be on the same SoC. The communication channel between the serial port controller 142 and the serial port 143 may be initially open and communication channel between the serial port controller 144 and the serial port 143 may be initially closed. As described infra, the SoC may dynamically switch the serial port 143 from being connected to the serial port controller 142 to being connected to the serial port controller 144. In other words, the SoC can dynamically close the communication channel between the serial port controller 142 and the serial port 143 and then open the communication channel between the serial port controller 144 and the serial port 143. Subsequently, the SoC may switch the connection back to its initial state.

As described infra, the BMC 102 can route the serial port controller 144 to the serial port 143, thus allowing the debugging shell 136 to control the serial port controller 144 to communicate signals at the serial port 143, which is still available at production stage. A user can connect a debug console 196 to the serial port 143 to communicate with the debugging shell 136.

In certain configurations, the boot loader 131 may detect whether the BMC 102 is in a predetermined condition under which the serial port 143 should be switched to connect the serial port controller 144.

In a first technique, when the BMC 102 starts, the processor 112 executes the boot loader 131, which in turn boots the kernel 132. In one example, during the booting process or the operation process of the BMC 102, the boot loader 131, the kernel 132, or other components may detect operation failures of the BMC 102 and may determine that the BMC 102 should enter a debug mode. The boot loader 131, the kernel 132, or other components may configure the GPIO pin 113 to output a high voltage (e.g., at or above 3.3 volts). The boot loader 131, the kernel 132, or other components may then restart the BMC 102.

In this example, in each booting process, prior to starting booting the kernel 132, the boot loader 131 detects whether the GPIO pin 113 has a voltage above a threshold (e.g., 3.3 volts). When the voltage of the GPIO pin 113 is above the threshold, the boot loader 131 then instruct the SoC to switch the connection of the serial port 143 from the serial port controller 142 to the serial port controller 144. The boot loader 131 may further load the debugging shell 136, which is able to drive the serial port controller 144 to communicate through the serial port 143. As such, a user connects a debug console 196 to the serial port 143 to communicate with the debugging shell 136.

In a second technique, the BMC 102 employs a watch dog component to monitor the booting process. The watch dog may be configured to restart the BMC 102 after a predetermined time period (e.g., 30 seconds). Prior to the end of the predetermined time period (e.g., at the end of the booting process), the watch dog may be disabled by the boot loader 131 or the kernel 132, thus not restarting the BMC 102. If the booting process is not successful, then the watch dog is not disabled and the BMC 102 is restarted. The boot loader 131 may also use a counter to record the number of consecutive failures of the booting process.

If the number is greater than a threshold number (e.g., 5), in one configuration, the boot loader 131 may then instruct the SoC to switch the connection of the serial port 143 from the serial port controller 142 to the serial port controller 144. The boot loader 131 may further load the debugging shell 136, which is able to drive the serial port controller 144 to communicate through the serial port 143. As such, a user connects a debug console 196 to the serial port 143 to communicate with the debugging shell 136.

If the number is greater than a threshold number (e.g., 5), in another configuration, the boot loader 131 may enter into a recovery stage. In the recovery stage, can receive limited commands over the communication interfaces 111 and in particular, the KCS interface. A user may send a command from the host computer 190 to the boot loader 131. According to the command, the boot loader 131 instructs the SoC to switch the connection of the serial port 143 from the serial port controller 142 to the serial port controller 144. The boot loader 131 may further load the debugging shell 136, which is able to drive the serial port controller 144 to communicate through the serial port 143. As such, a user connects a debug console 196 to the serial port 143 to communicate with the debugging shell 136.

In certain configurations, after boot up, the kernel 132 may further loads the IPMI service 138. A user may send an IPMI Original Equipment Manufacturer (OEM) command to the IPMI service 138. According to the IPMI OEM command, the IPMI service 138 may request the kernel 132 to enter into debug mode. The kernel 132 may accordingly instructs the SoC to switch the connection of the serial port 143 from the serial port controller 142 to the serial port controller 144. The kernel 132 may further load the debugging shell 136, which is able to drive the serial port controller 144 to communicate through the serial port 143. As such, a user connects a debug console 196 to the serial port 143 to communicate with the debugging shell 136.

In certain configurations, after boot up, the kernel 132 may detect whether the BMC 102 is in a predetermined condition under which the serial port 143 should be switched to connect the serial port controller 144. For example, a process monitor of the kernel 132 may detect that one or more processes are experiencing continuous failures. In particular, the kernel 132 may detect that the IPMI service 138 is restarting continuously. The process monitor may accordingly instruct the SoC to switch the connection of the serial port 143 from the serial port controller 142 to the serial port controller 144. The process monitor may further load the debugging shell 136, which is able to drive the serial port controller 144 to communicate through the serial port 143. As such, a user connects a debug console 196 to the serial port 143 to communicate with the debugging shell 136.

Figure 2:
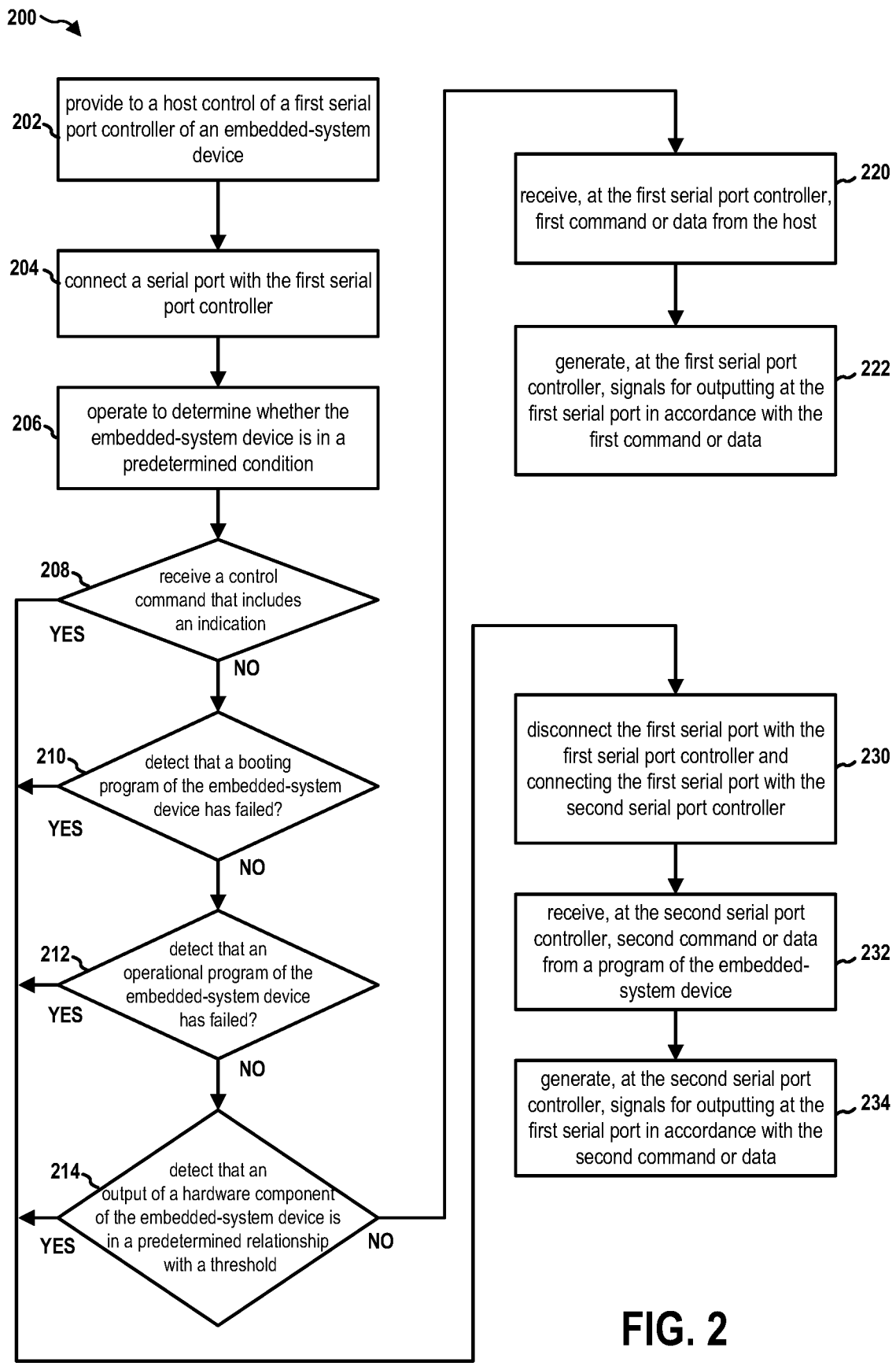
FIG. 2 is a flow chart of a method (process) for switching a connection of a serial port.

FIG. 2 is a flow chart 200 of a method (process) for switching a connection of a serial port. The method may be performed by an embedded-system device (e.g., the BMC 102 and the apparatus 102'). In certain configurations, at operation 202, the embedded-system device provides to a host (e.g., the host computer 190) of the embedded-system device control of a first serial port controller (e.g., the serial port controller 142) of the embedded-system device. At operation 204, the embedded-system device connects the serial port (e.g., the serial port 143) with the first serial port controller.

At operation 206, the embedded-system device operates to determine whether the embedded-system device is in a predetermined condition. More specifically, in certain configurations, at operation 208, the embedded-system device determines whether it has received a control command (e.g., IPMI OEM command or KCS command) that includes an indication. The embedded-system device is in the predetermined condition in accordance with the indication. In certain configurations, the control command is received at an operational program (e.g., the kernel 132) of the embedded-system device after the operational program has been booted up by a booting program (e.g., the boot loader 131) of the embedded-system device. In certain configurations, the control command is received at the booting program of the embedded-system device during that the booting program is booting the operational program of the embedded-system device.

When the embedded-system device has received an indication, the embedded-system device enters operation 230, which is described infra. When the embedded-system device has not received an indication, at operation 210, the embedded-system device attempts to detect that a booting program of the embedded-system device has failed.

When the embedded-system device has detected such a failure of the booting program, the embedded-system device enters operation 230. When the embedded-system device has not detected such a failure of the booting program, at operation 212 embedded-system device attempts to detect that an operational program (e.g., the IPMI service 138) of the embedded-system device has failed.

When the embedded-system device has detected such a failure of the operational program, the embedded-system device enters operation 230. When the embedded-system device has not detected such a failure of the operational program, at operation 214, embedded-system device determines whether an output of a hardware component (e.g., the GPIO pin 113) of the embedded-system device is in a predetermined relationship with a threshold.

When the output of the hardware component is in the predetermined relationship with a threshold, the embedded-system device enters operation 230. When the output of the hardware component is not in the predetermined relationship with a threshold, the embedded-system device maintains the connection between the serial port with the first serial port controller. At operation 220, the embedded-system device receives, at the first serial port controller, first command or data from the host. At operation 222, the embedded-system device generates, at the first serial port controller, signals for outputting at the serial port in accordance with the first command or data.

When the embedded-system device enters operation 230 as described supra, the embedded-system device disconnects the serial port from the first serial port controller and connects the serial port with a second serial port controller (e.g., the serial port controller 144). In certain configurations, at operation 232, the embedded-system device receives, at the second serial port controller, second command or data (e.g., debugging command or data) from a program (e.g., the debugging shell 136) of the embedded-system device. At operation 234, the embedded-system device generates, at the second serial port controller, signals for outputting at the serial port in accordance with the second command or data.

Figure 3:
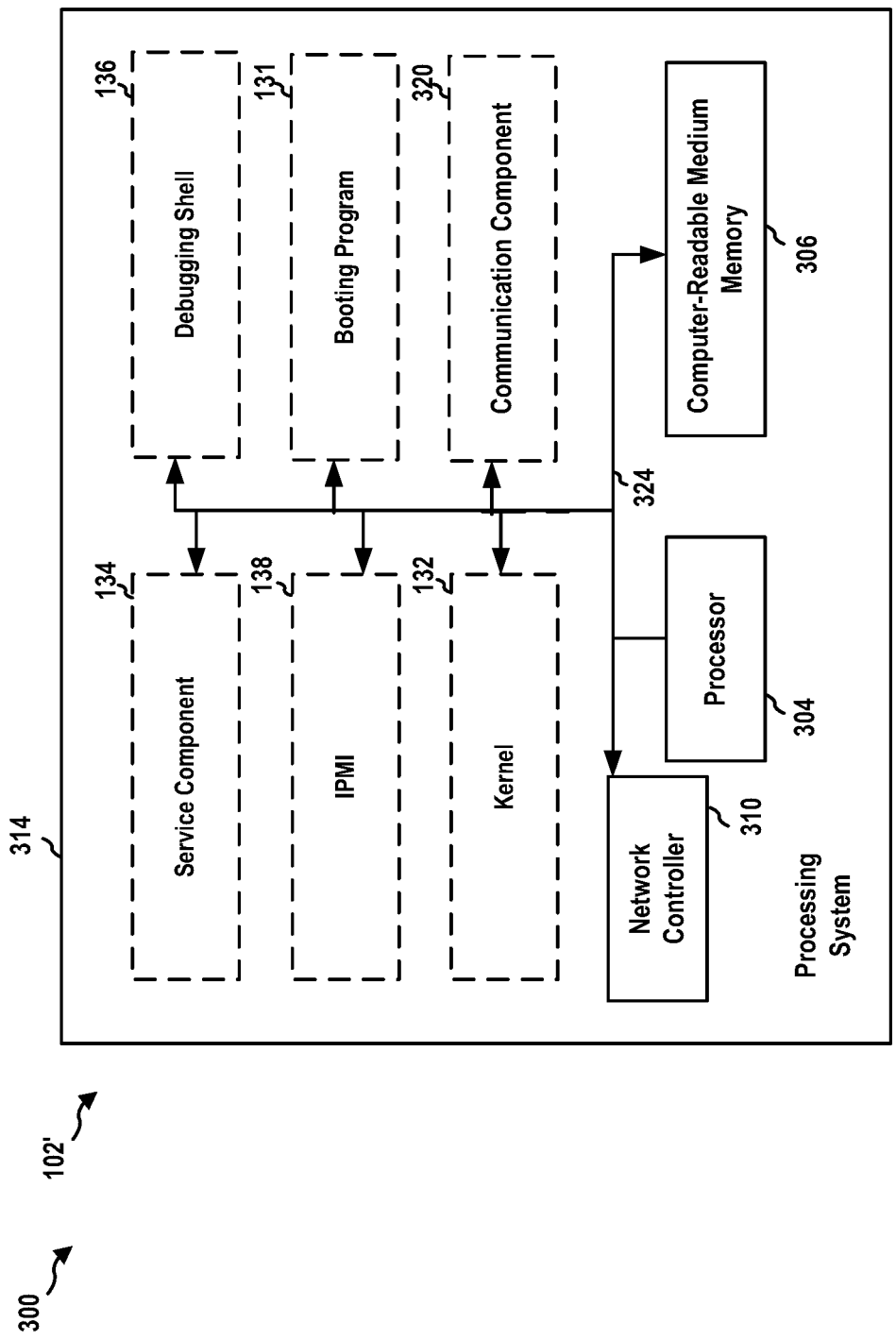
FIG. 3 is a diagram illustrating an example of a hardware implementation for an apparatus employing a processing system.

FIG. 3 is a diagram 300 illustrating an example of a hardware implementation for an apparatus 102' employing a processing system 314. The processing system 314 may be implemented with a bus architecture, represented generally by the bus 324. The bus 324 may include any number of interconnecting buses and bridges depending on the specific application of the processing system 314 and the overall design constraints. The bus 324 links together various circuits including one or more processors and/or hardware components, represented by, among other components, the processor 304, the computer-readable medium/memory 306, and the network controller 310. In particular, the computer-readable medium/memory 306 may include the memory 114 and the storage 117. The bus 324 may also link various other circuits such as timing sources, peripherals, voltage regulators, and power management circuits, which are well known in the art, and therefore, will not be described any further.

The processing system 314 may be coupled to a network controller 310. The network controller 310 provides a means for communicating with various other apparatus over a network. The network controller 310 receives a signal from the network, extracts information from the received signal, and provides the extracted information to the processing system 314, specifically a communication component 320 of the apparatus 102'. In addition, the network controller 310 receives information from the processing system 314, specifically the communication component 320, and based on the received information, generates a signal to be sent to the network. The processing system 314 includes a processor 304 coupled to a computer-readable medium/memory 306. The processor 304 is responsible for general processing, including the execution of software stored on the computer-readable medium/memory 306. The software, when executed by the processor 304, causes the processing system 314 to perform the various functions described supra for any particular apparatus. The computer-readable medium/memory 306 may also be used for storing data that is manipulated by the processor 304 when executing software. The processing system further includes at least one of the service components 134, the debugging shell 136, the IPMI service 138, the boot loader 131, and the kernel 132. The components may be software components running in the processor 304, resident/stored in the computer readable medium/memory 306, one or more hardware components coupled to the processor 304, or some combination thereof.

The apparatus 102' may be configured to include means for performing each of the operations described supra referring to FIG. 2. The aforementioned means may be one or more of the aforementioned components of the apparatus 102' and/or the processing system 314 of the apparatus 102' configured to perform the functions recited by the aforementioned means.

Figure 4:
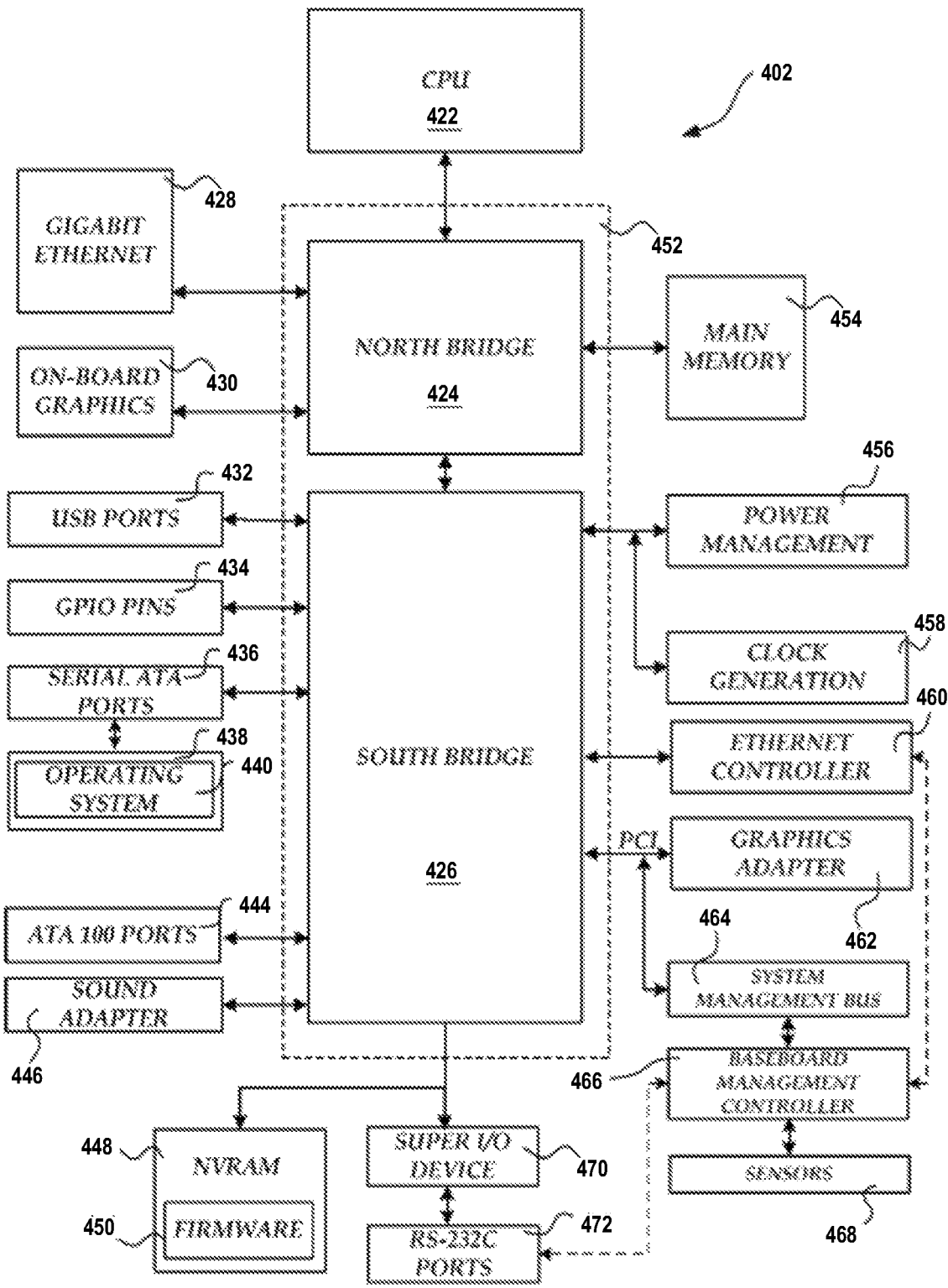
FIG. 4 shows a computer architecture for a computer.

FIG. 4 and the following discussion are intended to provide a brief, general description of one suitable computing environment in which aspects of the embodiments described herein may be implemented. In particular, FIG. 4 shows a computer architecture for a computer 402 that may be utilized to embody the host computer 190, as described supra. It should be appreciated that the computer architecture shown in FIG. 4 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 402 shown in FIG. 4 includes a baseboard, or "motherboard," which is a printed circuit board to which a multitude of components or devices may be connected by way of a system bus or other electrical communication path. In one illustrative embodiment, a CPU 422 operates in conjunction with a chipset 452. The CPU 422 is a standard central processor that performs arithmetic and logical operations necessary for the operation of the computer. The server computer 402 may include a multitude of CPUs 422.

The chipset 452 includes a north bridge 424 and a south bridge 426. The north bridge 424 provides an interface between the CPU 422 and the remainder of the computer 402. The north bridge 424 also provides an interface to a random access memory ("RAM") used as the main memory 454 in the computer 402 and, possibly, to an on-board graphics adapter 430. The north bridge 424 may also include functionality for providing networking functionality through a gigabit Ethernet adapter 428. The gigabit Ethernet adapter 428 is capable of connecting the computer 402 to another computer via a network. Connections which may be made by the network adapter 428 may include LAN or WAN connections. LAN and WAN networking environments are commonplace in offices, enterprise-wide computer networks, intranets, and the internet. The north bridge 424 is connected to the south bridge 426.

The south bridge 426 is responsible for controlling many of the input/output functions of the computer 402. In particular, the south bridge 426 may provide one or more USB ports 432, a sound adapter 446, an Ethernet controller 460, and one or more GPIO pins 434. The south bridge 426 may also provide a bus for interfacing peripheral card devices such as a graphics adapter 462. In one embodiment, the bus comprises a PCI bus. The south bridge 426 may also provide a system management bus 464 for use in managing the various components of the computer 402. Additional details regarding the operation of the system management bus 464 and its connected components are provided below.

The south bridge 426 is also operative to provide one or more interfaces for connecting mass storage devices to the computer 402. For instance, according to an embodiment, the south bridge 426 includes a serial advanced technology attachment ("SATA") adapter for providing one or more SATA ports 436 and an ATA 100 adapter for providing one or more ATA 100 ports 444. The SATA ports 436 and the ATA 100 ports 444 may be, in turn, connected to one or more mass storage devices such as the SATA disk drive 438 storing an operating system 440 and application programs.

As known to those skilled in the art, an operating system 440 comprises a set of programs that control operations of a computer and allocation of resources. An application program is software that runs on top of the operating system software, or other runtime environment, and uses computer resources to perform application specific tasks desired by the user. According to one embodiment of the invention, the operating system 440 comprises the LINUX operating system. According to another embodiment of the invention the operating system 440 comprises an operating system within the WINDOWS family of operating systems from MICROSOFT CORPORATION. According to another embodiment, the operating system 440 comprises the UNIX, LINUX, or SOLARIS operating system. It should be appreciated that other operating systems may also be utilized.

The mass storage devices connected to the south bridge 426, and their associated computer storage media, provide non-volatile storage for the computer 402. Although the description of computer storage media contained herein refers to a mass storage device, such as a hard disk or CD-ROM drive, it should be appreciated by those skilled in the art that computer storage media can be any available media that can be accessed by the computer 402.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 426 for connecting a "Super I/O" device 470. The Super I/O device 470 is responsible for providing a number of input/output ports, including a keyboard port, a mouse port, a serial interface 472, a parallel port, and other types of input/output ports. The LPC interface may also connect a computer storage media such as a ROM or a flash memory such as a NVRAM 448 for storing the firmware 450 that includes program code containing the basic routines that help to start up the computer 402 and to transfer information between elements within the computer 402.

As described briefly above, the south bridge 426 may include a system management bus 464. The system management bus 464 may include a BMC 466. The BMC 466 may be the BMC 102. In general, the BMC 466 is a microcontroller that monitors operation of the computer system 402. In a more specific embodiment, the BMC 466 monitors health-related aspects associated with the computer system 402, such as, but not limited to, the temperature of one or more components of the computer system 402, speed of rotational components (e.g., spindle motor, CPU Fan, etc.) within the system, the voltage across or applied to one or more components within the system 402, and the available or used capacity of memory devices within the system 402. To accomplish these monitoring functions, the BMC 466 is communicatively connected to one or more components by way of the management bus 464. In an embodiment, these components include sensor devices 468 for measuring various operating and performance-related parameters within the computer system 402. The sensor devices 468 may be either hardware or software based components configured or programmed to measure or detect one or more of the various operating and performance-related parameters.

It should also be appreciated that the computer 402 may comprise other types of computing devices, including handheld computers, embedded computer systems, personal digital assistants, and other types of computing devices known to those skilled in the art. It is also contemplated that the computer 402 may not include all of the components shown in FIG. 4, may include other components that are not explicitly shown in FIG. 4, or may utilize an architecture completely different than that shown in FIG. 4.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating an embedded-system device, comprising:
    providing to a host of the embedded-system device control of a first serial port controller at the embedded-system device;
    providing to an operational program at the embedded-system device control of a second first serial port controller of the embedded-system device;
    connecting a serial port at the embedded-system device with the first serial port controller;
    determining whether the embedded-system device is in a predetermined condition;
    when the embedded-system device is not in the predetermined condition:
        receiving, at the first serial port controller, first command or data from the host for driving the first serial port controller;
        generating, at the first serial port controller, first signals in accordance with the first command or data; and
        outputting the first signals at the serial port;
    when the embedded-system device is in the predetermined condition:
        disconnecting the serial port from the first serial port controller;
        connecting the serial port with a second serial port controller at the embedded-system device;
        receiving, at the second serial port controller, second command or data from the operational program for driving the second serial port controller;
        generating, at the second serial port controller, second signals in accordance with the second command or data; and
        outputting the second signals at the serial port.

2. The method of claim 1, further comprising:
    receiving, at the first serial port controller, first command or data from the host; and
    generating, at the first serial port controller, signals for outputting at the serial port in accordance with the first command or data, when the embedded-system device is not in the predetermined condition.

3. The method of claim 1, further comprising:
    receiving, at the second serial port controller, second command or data from a program of the embedded-system device; and
    generating, at the second serial port controller, signals for outputting at the serial port in accordance with the second command or data, when the serial port is connected to the second serial port controller.

4. The method of claim 1, further comprising:
    receiving a control command that includes an indication, wherein whether the embedded-system device is in the predetermined condition is determined based on the indication.

5. The method of claim 4, wherein the control command is received at an operational program of the embedded-system device after the operational program has been booted up by a booting program of the embedded-system device.

6. The method of claim 4, wherein the control command is received at a booting program of the embedded-system device during that the booting program is booting an operational program of the embedded-system device.

7. The method of claim 1, further comprising:
    detecting that a booting program of the embedded-system device has failed, and wherein the embedded-system device is determined to be in the predetermined condition.

8. The method of claim 1, further comprising:
    detecting that an operational program of the embedded-system device has failed, and wherein the embedded-system device is determined to be in the predetermined condition.

9. The method of claim 1, further comprising:
    detecting that an output of a hardware component of the embedded-system device is in a predetermined relationship with a threshold, and wherein the embedded-system device is determined to be in the predetermined condition.

10. An apparatus, the apparatus being an embedded-system device, comprising:
    a memory; and
    at least one processor coupled to the memory and configured to:
        provide to a host of the embedded-system device control of a first serial port controller at the embedded-system device;
        provide to an operational program at the embedded-system device control of a second first serial port controller of the embedded-system device;
        connect a serial port at the embedded-system device with the first serial port controller;
        determine whether the embedded-system device is in a predetermined condition;
        when the embedded-system device is not in the predetermined condition:
            receive, at the first serial port controller, first command or data from the host for driving the first serial port controller;
            generate, at the first serial port controller, first signals in accordance with the first command or data; and
            output the first signals at the serial port;
        when the embedded-system device is in the predetermined condition:
            disconnect the serial port from the first serial port controller;

connect the serial port with a second serial port controller at the embedded-system device;

receive, at the second serial port controller, second command or data from the operational program for driving the second serial port controller;

generate, at the second serial port controller, second signals in accordance with the second command or data; and output the second signals at the serial port.

11. The apparatus of claim 10, wherein the at least one processor is further configured to:

receive, at the first serial port controller, first command or data from the host; and generate, at the first serial port controller, signals for outputting at the serial port in accordance with the first command or data, when the embedded-system device is not in the predetermined condition.

12. The apparatus of claim 10, wherein the at least one processor is further configured to:

receive, at the second serial port controller, second command or data from a program of the embedded-system device; and generate, at the second serial port controller, signals for outputting at the serial port in accordance with the second command or data, when the serial port is connected to the second serial port controller.

13. The apparatus of claim 10, wherein the at least one processor is further configured to:

receive a control command that includes an indication, wherein whether the embedded-system device is in the predetermined condition is determined based on the indication.

14. The apparatus of claim 13, wherein the control command is received at an operational program of the embedded-system device after the operational program has been booted up by a booting program of the embedded-system device.

15. The apparatus of claim 13, wherein the control command is received at a booting program of the embedded-system device during that the booting program is booting an operational program of the embedded-system device.

16. The apparatus of claim 10, wherein the at least one processor is further configured to:

detect that a booting program of the embedded-system device has failed, and wherein the embedded-system device is determined to be in the predetermined condition.

17. The apparatus of claim 10, wherein the at least one processor is further configured to:

detect that an operational program of the embedded-system device has failed, and wherein the embedded-system device is determined to be in the predetermined condition.

18. The apparatus of claim 10, wherein the at least one processor is further configured to:

detect that an output of a hardware component of the embedded-system device is in a predetermined relationship with a threshold, and wherein the embedded-system device is determined to be in the predetermined condition.

19. A non-transitory computer-readable medium storing computer executable code for operating an embedded-system device, comprising code to:

provide to a host of the embedded-system device control of a first serial port controller at the embedded-system device;

provide to an operational program at the embedded-system device control of a second first serial port controller of the embedded-system device;

connect a serial port at the embedded-system device with the first serial port controller;

determine whether the embedded-system device is in a predetermined condition;

when the embedded-system device is not in the predetermined condition:

receive, at the first serial port controller, first command or data from the host for driving the first serial port controller;

generate, at the first serial port controller, first signals in accordance with the first command or data; and output the first signals at the serial port;

when the embedded-system device is in the predetermined condition:

disconnect the serial port from the first serial port controller;

connect the serial port with a second serial port controller at the embedded-system device;

receive, at the second serial port controller, second command or data from the operational program for driving the second serial port controller;

generate, at the second serial port controller, second signals in accordance with the second command or data; and output the second signals at the serial port.

20. The non-transitory computer-readable medium of claim 19, wherein the code is further configured to:

receive, at the first serial port controller, first command or data from the host; and generate, at the first serial port controller, signals for outputting at the serial port in accordance with the first command or data, when the embedded-system device is not in the predetermined condition.

* * * * *